United States Patent
Crowson et al.

(10) Patent No.: US 6,870,918 B1
(45) Date of Patent: Mar. 22, 2005

(54) METHOD AND SYSTEM FOR PROCESSING A CALL ASSOCIATED WITH A CALLER'S ACCOUNT IDENTITY

(75) Inventors: Neil Jonathan Crowson, Woodbridge (GB); Laura N Stockton, Berkhamsted (GB)

(73) Assignee: British Telecommunication public limited company, London (GB)

( * ) Notice: Subject to any disclaimer, the term of this patent is extended or adjusted under 35 U.S.C. 154(b) by 0 days.

(21) Appl. No.: 09/622,787

(22) PCT Filed: Feb. 23, 1999

(86) PCT No.: PCT/GB99/00552

§ 371 (c)(1),
(2), (4) Date: Mar. 14, 2001

(87) PCT Pub. No.: WO99/44351

PCT Pub. Date: Sep. 2, 1999

(30) Foreign Application Priority Data

Feb. 25, 1998 (EP) ............................................ 98301395

(51) Int. Cl.[7] ................................................ H04M 3/42
(52) U.S. Cl. ........................... 379/207.02; 379/142.04; 379/211.02
(58) Field of Search ...................... 379/67.1, 69, 88.19, 379/88.2, 88.21, 142.04, 142.06, 207.02, 207.05, 207.08, 207.11, 207.13, 207.14, 207.15, 211.01, 211.02

(56) References Cited

U.S. PATENT DOCUMENTS

| | | | | |
|---|---|---|---|---|
| 5,455,852 A | * | 10/1995 | Elrod et al. | 379/88.11 |
| 5,568,541 A | | 10/1996 | Greene | 379/114.25 |
| 5,646,982 A | * | 7/1997 | Hogan et al. | 379/88.22 |
| 5,751,794 A | * | 5/1998 | Kugell et al. | 379/88.22 |
| 5,778,052 A | * | 7/1998 | Rubin et al. | 379/88.25 |
| 5,825,867 A | * | 10/1998 | Epler et al. | 379/215.01 |
| 5,832,060 A | * | 11/1998 | Corlett et al. | 379/88.19 |
| 5,844,896 A | * | 12/1998 | Marks et al. | 370/385 |
| 5,904,013 A | * | 5/1999 | Greenspan et al. | 379/211.04 |
| 5,930,700 A | * | 7/1999 | Pepper et al. | 455/414 |
| 6,215,857 B1 | * | 4/2001 | Kasiviswanathan | 379/67.1 |

FOREIGN PATENT DOCUMENTS

| | | |
|---|---|---|
| EP | 0411796 A2 | 2/1991 |
| EP | 0 480 622 A2 | 4/1992 |
| WO | WO 96/13114 | 5/1996 |

* cited by examiner

*Primary Examiner*—Bing Q. Bui
(74) *Attorney, Agent, or Firm*—Nixon & Vanderhye P.C.

(57) ABSTRACT

In a telecommunications network, a customer account identity is communicated to a platform used, for example, for cashless calling. A call is initiated via the platform. Network signalling is monitored, and if call setup is not successfully completed then the customer is automatically offered a message forwarding service. The call setup process may continue while the message forwarding service is offered to the customer, allowing the call to be completed directly if in the meantime the called party picks up the phone.

16 Claims, 4 Drawing Sheets

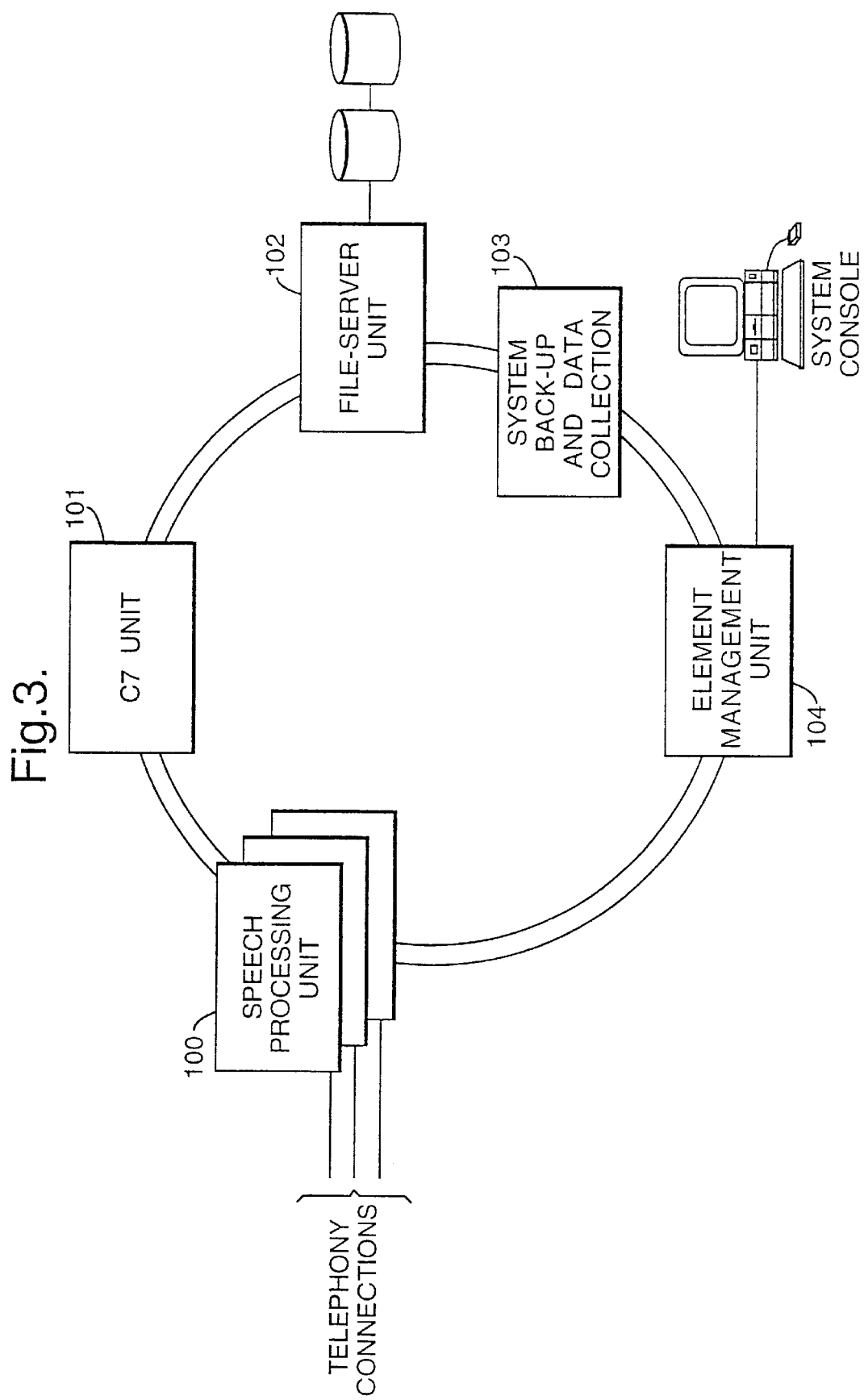

METHOD AND SYSTEM FOR PROCESSING A CALL ASSOCIATED WITH A CALLER'S ACCOUNT IDENTITY

BACKGROUND TO THE INVENTION

The present invention relates to a telecommunications network, and in particular, but not exclusively to a network that incorporates a platform which supports cash-less calling.

Typically in a network which offers the possibility of cash-less calling, customers are issued with account numbers, together with a telephone number for accessing the service. When that number is dialled, the customer is connected via the network to a cashless services platform which records the customer's account details, sets up the call to a destination specified by the customer, and ensures that the call is billed appropriately to the customer's account, rather than to an account associated with the line from which the call is originated.

SUMMARY OF THE INVENTION

According to a first aspect of the present invention, there is provided a method of operating a telecommunications network comprising:

a) communicating a signal identifying an originating customer to a service platform connected to the telecommunications network:

b) initiating via the service platform a call setup process for a call from the customer to called party;

c) monitoring at the service platform network signalling indicating the status of the call setup process;

d) when the network signalling indicates call setup has not successfully completed, automatically offering to the customer, via the service platform, a message forwarding service.

The present invention enhances significantly the operation of services, such as a cashless calling service, provisioned for an originating customer by offering to customers of that service a message-forwarding service which can be used to complete the call when, for example, the called number is busy, or when there is no reply. Conventionally, message deposit services, such as BT's CallMinder™ have been associated with called party lines, and have relied upon knowledge of the line status which is readily available at the local exchange. The present invention, by contrast, uses monitoring of network signalling (such as a BUSY signal) to implement a message store-and-forward service via a network service platform, with the service provisioned for the calling party rather than the called party.

When the service platform is a cashless calling platform, the signal in step (a) may be a customer account identity.

Preferably, the call setup process continues while the message forwarding service is offered to the customer.

The inventors have found that the user interface for the service is enhanced significantly if the call setup process continues while the offer of a call forwarding service is made. Then, for example, if the called party picks up the phone, the call can still be completed directly. This makes it possible to trigger the offer of the message forwarding service on ring tone no reply (RTNR) after a relatively short time, which may be considerably shorter than the time-out for RTNR which is normally included in the network.

Preferably the method includes offering the customer direct access to the message forwarding service, and when direct access is selected by the customer steps (b) to (d) are not carried out for that call. This feature of the invention allows the customer to choose not to attempt to call another party directly, but instead to leave a message with the message forwarding service.

Preferably the service platform includes an intelligent platform which stores customer account data, and a telecommunications switch which is connected to a network signalling channel and which executes the call setup process via the network signalling channel, and the step of monitoring network signalling is carried out by the telecommunictions switch.

Preferably, when the customer selects the message forwarding service, the service platform connects the customer to a messaging platform remote from the said service platform. In this case, preferably the customer account identity is transmitted to the messaging platform from the service platform in the dialled digit field of the network signalling channel. Preferably the called party number of the previously attempted destination, if there is one, is transmitted to the messaging platform as an in-band signal.

Preferably when a customer account identity is communicated to the service platform the intelligent platform determines from the customer account data whether a message forwarding service is provisioned for the customer, and communicates to the telecommunications switch a signal indicating whether the said service is provisioned. Preferably the said signal is communicated in the calling party category field of a signalling protocol defined for the interface between the intelligent platform and the telecommunications switch.

Calling Party Category (CPC) is a field which is included in many commonly used telecommunications network signalling protocols including ANSI SS7 (signalling system no. 7) and BT NUP (National User Part). Conventionally it is used to indicate, for example, whether a call originates from a residential line, a payphone or a business line. This preferred feature of the present invention uses this field instead for communication between the intelligent platform and the telecommunications switch to identify calls in which the message forwarding service is in operation.

According to a second aspect of the present invention, there is provided a service platform for use in a method according to any one of the preceding claims, comprising:

a) a signalling interface for receiving a signal identifying an originating customer b) a data store programmed with customer data;

c) means for monitoring the progress of a call setup process for a call from the customer to a called party; and d) message service control means responsive to the said means for monitoring, and arranged to offer the customer a message forwarding service when call setup has not completed successfully.

DESCRIPTION OF DRAWINGS

Systems embodying the present invention will now be described in further detail, by way of example only, with reference to the accompanying drawings in which:

FIG. 3 is a diagram showing the architecture of a speech application platform;

DESCRIPTION OF EXEMPLARY EMBODIMENTS

Figure 1:
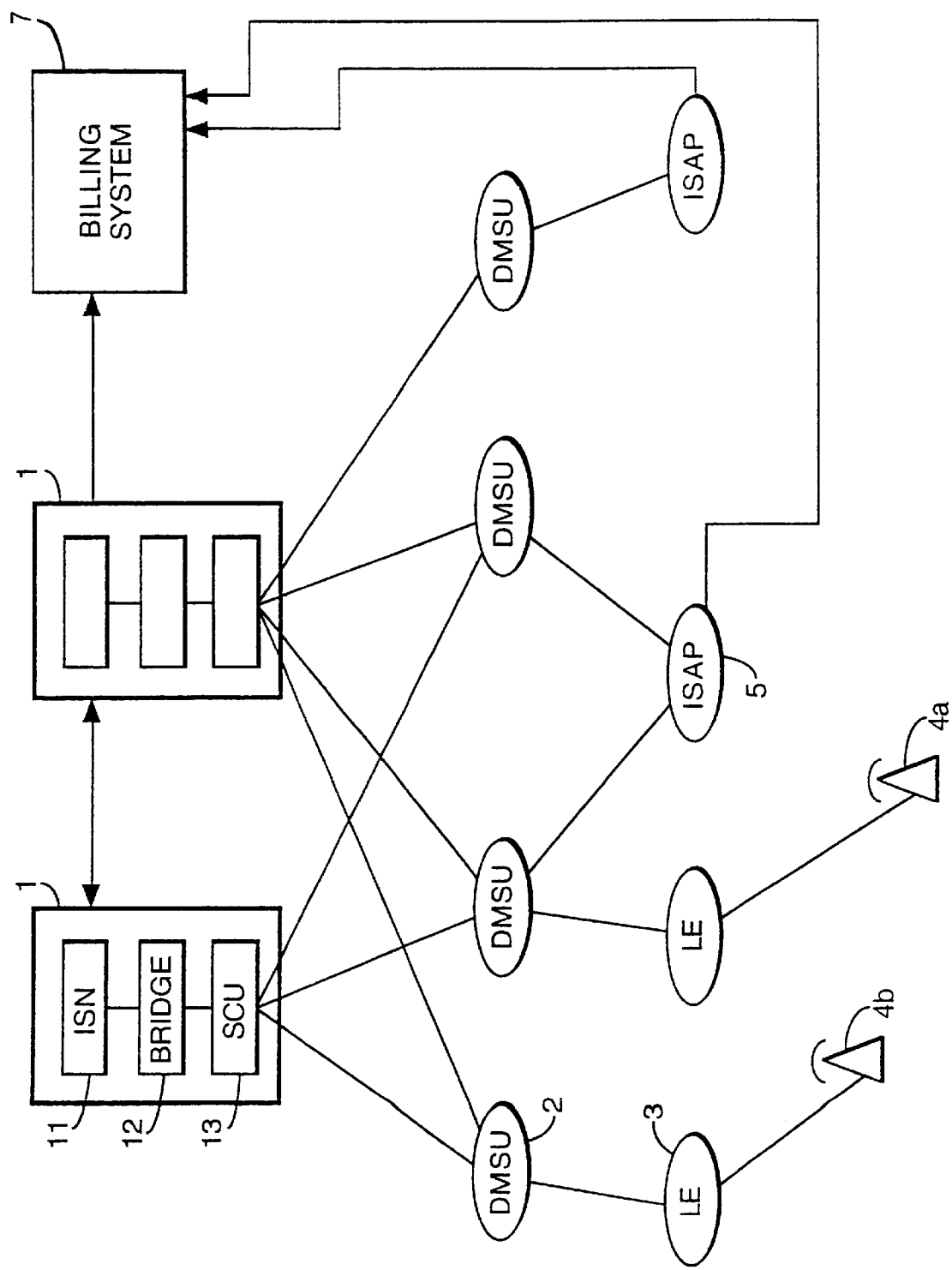
FIG. 1 is a schematic showing a network embodying the invention.
Figure 4:
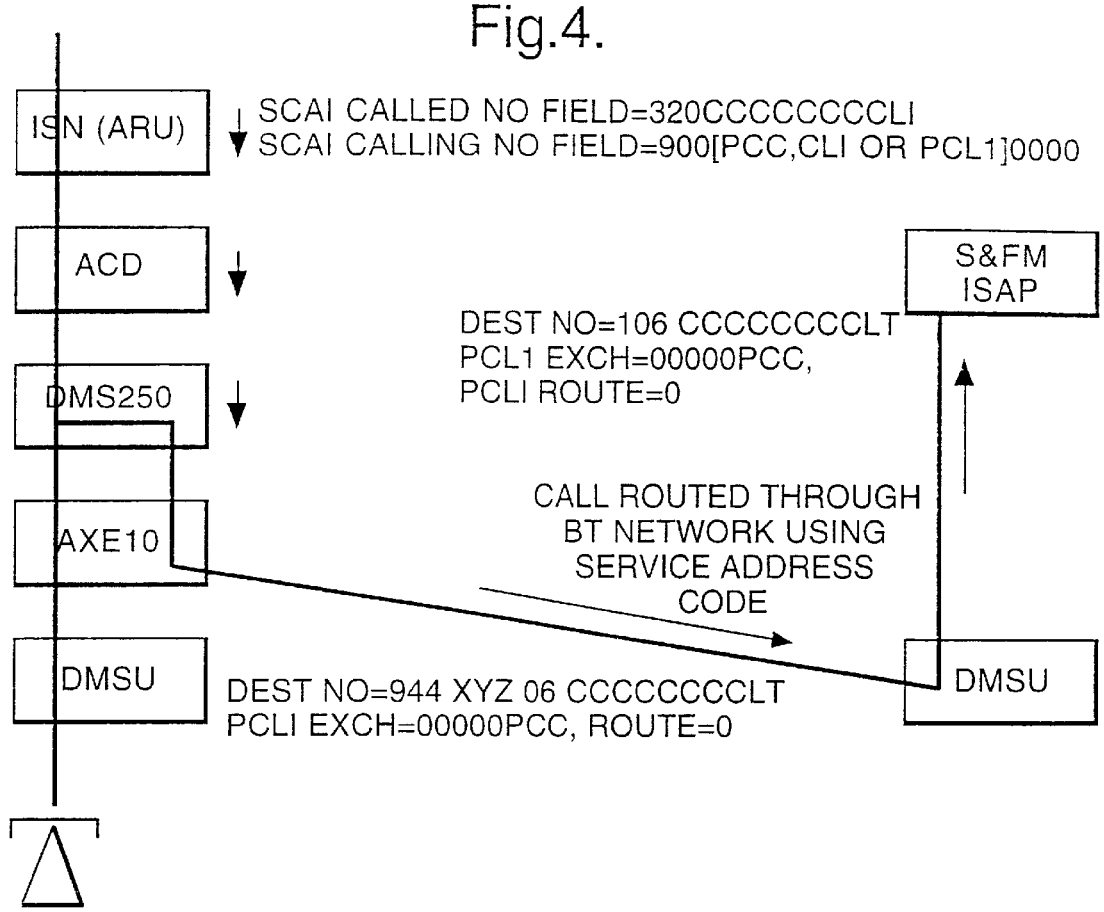
FIG. 4 shows a message being stored.
Figure 5:
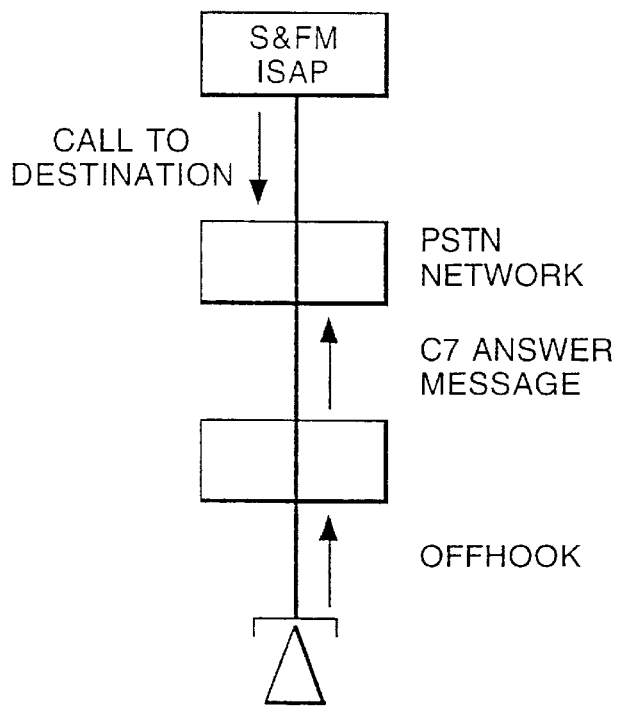
FIG. 5 shows a message being forwarded.

As shown in FIG. 1, a telecommunications network includes a number of service platforms 1 which implement a cashless calling service. Each platform 1 includes an intelligent services network (ISN). The intelligent services network is a computing platform comprising a number of networked processors which implements service logic for the cashless calling service. A bridge 12 bridges calls from the network to the ISN. The bridge 12 is connected to the network via a signalling converter unit (SCU) 13 which translates between the signalling protocols of the wider network, such as BT NUP, and the protocol ANSI ISUP (ISDN User Part) used on the interface to the ISN. In the present example, the bridge is embodied by a DMS250 switch manufactured by Nortel, and the signalling converter unit is an AXE10 switch manufactured by Ericsson. FIG. 4 shows a message being stored; and FIG. 5 shows a message being forwarded.

The service platforms 1 are connected via trunk switches, also termed Digital Main Switching Units (DMSU's), and local exchanges (LE) to customer terminals 4a, 4b. Although for ease of illustration only two customer terminals and four local exchanges are shown in the Figure, it will be understood that real networks will include many more terminals and local exchanges. Interactive speech applications platforms (ISAPs) 5 are connected to some of the trunk switches. The ISAP's 5 and service platforms 1 are connected to a billing system 7.

FIG. 3 shows the architecture of an ISAP. The ISAP comprises speech processing units 100 which terminate telephony connections. The speech processing units 100 are connected via a local area network (LAN) to a C7 unit 101, a file server unit 102, a system back-up and data collection module 103 and an element management unit 104. The speech processing units peform all the signal processing functions necessary for speech recognition and speech generation and runs the software which controls the relevant application. The processors for the speech processing units may comprise, for example, Motorola DSP56001 digital signal processors. In one implementation, these processors are linked to digital line interface cards and to other components of the speech processing units via a VME bus.

The ISAP is described in further detail in the edition of the BT Technology Journal Vol. 14, no. 2, April 1996. A conventional Intelligent Services Network (ISN) which may be adapted to implement the present invention is described in the paper by Steve Ellett, "Cashless Services Network Operation Unit", British Telecommunications Engineering, Vol 15, July 1996, pages 128–134.

In use when a customer wishes to use the cashless calling service, she dials the number for the service and is connected to one of the service platforms. She dials her account number and the digits of the called party number. The bridge switch in the ISN then switches the call through to the relevant destination terminal. The ISN generates appropriate billing data which is passed to the billing system, so that the call is charged to the customer's account and not the account associated with the line from which she is calling. In addition to these steps, which are conventional in cashless calling services, the ISN determines from a subscriber profile associated with the account number whether the customer has previously subscribed to a store & forward messaging (S&FM) service. If she has, then the user is offered a menu option of leaving a message for the called number rather than attempting a direct connection to the called number. If she does not select this option, then call setup goes ahead, but with detection points armed on the SCU to notify the caller if the call is not successfully completed, for example if a BUSY signal is returned. A timer is also started which times out if there is no reply e.g. after seven rings. If this timer times out, or if the call is not completed for other reasons, then the the caller is given the option to be connected to one of the ISAP's 5. Via the ISAP the user is given the option of completing the call by storing a message to be forwarded later to the called party. If the option to be connected to one of the ISAPs is not taken up, then the attempt to set up the call continues until it is terminated e.g. by the calling party putting the telephone down, or by the network RTNR (ring tone no reply) timer expiring.

The service outlined above will now be described in further detail in the context of an implementation by BT in the UK PSTN (public switched telephony network) in association with BT's ChargeCard cashless calling service.

In this implementation, the store and forward messaging service is available as a ChargeCard menu option and gives a customer the option to deposit a message to one or more destination numbers. The network then makes several attempts to deliver the message to the recipient(s). In addition, if the customer has attempted to make a call but the call is unsuccessful, i.e. in ring tone no reply or engaged situations, the caller is prompted to use the store and forward messaging service. The ChargeCard holder can use a Status Check facility to determine if a message has been delivered.

The S&FM service uses voice recognition technology and can accept both DTMF (Dual-Tone Multi-Frequency) or spoken responses. This allows the caller to utilise the service with or without a DTMF phone. Access to S&FM Service When the customer first accesses the ChargeCard service, the ISN prompts the customer for the ChargeCard Account number and PIN. The ISN then validates the account number/PIN against a card record for that account. A 'Message Store & Forward' flag in the card record indicates that the account holder has subscribed to the S&FM facility.

On experiencing busy or no reply, a script is played offering the caller the option of leaving a message. This option is also offered directly, as an alternative to attempting a direct call. The caller takes up this option by entering *2 at the following ChargeCard main menu prompt:

"Please enter the phone number you require, including the full national or international code, now. {Optional part:] For message delivery option, enter *2. [Then, for all callers:] To speed dial . . . "

For No Reply (RTNR), the message is played after 7 rings (i.e. 21 seconds), inviting the customer to use the messaging service. For Busy, this message prompt is played immediately, and includes a single burst of engaged tone at the start. Once either message is finished, the caller is returned to the appropriate signal, but may invoke the messaging service at any time. This service is offered only if the caller has subscribed to S&FM, and if messaging is permitted to the number dialled. The caller is asked to re-originate the call by dialling ## and then use the *2 option on the ChargeCard menu.

The ChargeCard service allows the user to select the language used for voice interactions with the service. Any language selection made by the caller for the ChargeCard service will also apply to the S&FM service.

The user may access the ChargeCard service via a human operator. The operator is able to select the S&FM service by entering *2 on the caller's behalf. However, the operator does not then have the ability to transfer the Last Number Dialed (if one exists) across to the S&FM system.

When the S&FM service is selected, the following events occur:

(a) The caller is transferred to the appropriate ISAP;

(b) Call and Caller-related information is passed to the ISAP in the Called Number and Calling number fields;

(c) Where available, the Last Number Dialed (LND) is passed across in-band using DTMF.

Routing from AXE10

In a first implementation, if a valid national destination number is entered, and S&FM is subscribed to, then the ISN adds a prefix of '340' to the Called Number field of the message. On receipt of the resultant message, the AXE10 will strip this '340' prefix before routing the call to the appropriate DMSU.

The '340' prefix cannot be added to International destinations as there is a limit on the number of digits that can be passed in the Called Number field. In an alternative and preferred implementation this problem is avoided by using a CPC (calling party category) value to indicate that the caller has S&FM, rather than using a prefix on the called number.

The following table shows the conditions for which, in the first implementation '340' is added to the Called Number field:

| CONDITION: | | | | | else: |
|---|---|---|---|---|---|
| Valid call: UK to UK | Y | — | — | — | |
| Valid call: UK to International | — | Y | — | — | |
| Valid call: International to UK | — | — | Y | — | |
| Valid call: International to International | — | — | — | Y | |
| S&FM subscribed to | Y | Y | Y | Y | |
| ACTION: | | | | | |
| Include '340' prefix | Y | N | Y | N | N |

In the alternative implementation, the CPC value is set to identify the S&FM feature for those conditions in which the '340' prefix is included in the first implementation, and additionally for valid international calls.

On receipt of the message from the ISN, the AXE10 uses the '340' prefix on the Called number field, or the equivalent CPC value, to identify this as a S&FM ISAP call. The CPC vaule specifies the prompt language. If the '340' prefix or the equivalent CPC value is detected, the AXE10 will, on experiencing busy tone, or 21 seconds (i.e. 7 rings) of RTNR, check against its data tables whether messaging is permitted to the number called (e.g. messaging will probably not be permitted to 1xx numbers, to premium numbers, or to certain mobile numbers), will switch the caller to an announcement offering the caller the option of re-originating and accessing the messaging service, and finally will return the caller to the busy/RTNR tone (unless the caller has re-originated the call).

Ringing tone is always applied at the destination end, and as different networks have different tones, it is difficult for a switch reliably to detect ring tone. Instead the AXE10 assumes a condition of RTNR whenever an ACM (address complete message) has been received from the BT Network, and no answer has been received from the BT Network, and a time-out, started on ACM receipt, has expired.

If the call is answered while the announcement is being played, then the caller is immediately switched back to through circuit.

Re-Origination

On re-origination, a different main menu announcement is played by the ISN for all re-originated calls. This announcement is worded in a way that doesn't emphasise the need to enter a destination, since the caller may have re-originated having been prompted by the AXE10 to enter '##' and wait for the next announcement about messaging. The re-origination message is as follows, with the *2 message prompt played only if the caller has subscribed to S&FM:

"To make a call, please enter the phone number you require. [Optional part: ] For message delivery options, enter *2. [Then, for all callers: ] To speed dial, . . . "

Transfer of Information to ISAP

The necessary data is transferred from the ISN to the ISAP in the following three ways:

1) "Called Number" Field

The following data is concatenated together and placed in the Called Number field of the signalling message, for connection to the ISAP:

Service Code (320)
Customer Id (i.e. the 8 digit card number)
Language digit
Card Type/Allowed Term/LND Indicator Placing this information in the Called Number field accomplishes both routing the call to the ISAP and passing the customer identification and treatment information. The information is written to the Called Number field in the following format:

320CCCCCCCCLI

Where:

320=The 3 digit Service Code for S&FM.

CCCCCCCC=The Store and Forward Messaging Customer Id, which is also the customer's 8 digit Card Number.

L=The Language digit associated with the language in which the call is being processed by the ChargeCard service. (10 languages max.) Assignment of this valueis as follows:

English 1
Welsh 2
French 3
German 4
Spanish 5
Japanese 6
Italian 7

I The Card Type/Allowed Term/LND indicator. This indicator is a combination of the Card Type setting and the International Direct Dial flag setting taken from the Customer's Card Record. This indicator will also tell the ISAP when to collect the previously attempted called number, i.e. the Last Number Dialed (LND). The following table defines the allowed values for this indicator:

| Card | Allowed Term Based on Int'l Flag in the Card Record | LND Available | Card Type/Allowed Term/LND Indicator |
|---|---|---|---|
| Normal CSRS-9 | National Only-Int'l flag set to N | No | 1 |
| Normal CSRS-9 | National & Int'l-Int'l flag set to Y | No | 2 |
| Normal CSRS-9 | National Only-Int'l flag set to N | Yes | 3 |
| Normal | National & | Yes | 4 |

-continued

| Card | Allowed Term Based on Int'l Flag in the Card Record | LND Available | Card Type/Allowed Term/LND Indicator |
|---|---|---|---|
| CSRS-9 | Int'l flag set to Y | | |

2) "Calling Number" field

The Calling Number field of the signalling message, used for connection to the ISAP contains one of the folowing:
Calling Line Identity (CLI)
Partial Calling Line Id (PCLI) indicator
Pseudo Country Code for incoming International calls.
3) Last Number Dialled (LND)

The LND, when available, is passed to the ISAP in-band using DTMF once a connection has been established. The DTMF string sent to the ISAP is in the following format:

ZZXXXXXXXXXX#

Where:
ZZ=National/International Number Prefix. '0'=National, '00'=International
XXXXXXXXXX=The previously attempted called number (LND).
=The terminating DTMF character.

Message Deposit

If the caller had attempted a Cashless call prior to entering *2 at the menu prompt, then as shown in FIG. 4, the called number is passed across to the S&FM system and can be used as the destination for any message deposited. The caller is prompted to record a message (of up to 5 minutes duration), is offered the opportunity to re-record it up to three times, and then is prompted again to ask if it is acceptable to use it. Message termination is recognised either by a period of silence, or by the entry of a numeric DTMF key. While any DTMF key may be used, the customer is advised to use a specific key, '1', to indicate the end of the message. The caller is then prompted for a 'first delivery attempt' time for delivery of the message to the previously called number (if one was passed). If entered, this time overrides a system default time for delivery of the message. The time is entered in 24 hour clock format.

The caller is then prompted for any further destination numbers that the message is to be delivered to, plus a 'first delivery attempt' time for each (which again is optional—if not entered, the system will use default delivery time). Up to ten destinations may be entered, including the originally called number (if passed).

On completion of message deposit, a farewell message is played stating that the caller should now press '##' to return to their ChargeCard menu.

Message Barring

There will be certain numbers for which ChargeCard calls are permitted, but messaging is not. Examples include Premium numbers (0891), and Cellnet and Vodafone numbers. Messaging will also be barred for all numbers for which ChargeCard calls are barred. Barring is also possible on a line-by-line basis.

The last number dialed, if available, is validated against the Message Barring tables to ensure that messaging is permitted to that number.

For each destination (including the LND, if transferred from the ISN), the ISAP will perform a check against its own Number Barring tables. If the number entered is barred, due to the number itself being barred, or a national ChargeCard attempting to forward to an international number, or an international source/destination pair on the barred inter-country list, then the caller will be played an apology stating that messages cannot be sent to that number. No delivery attempt will be made. The caller will them be asked if they would like to specify another number.

If the caller enters a destination starting with '0044', ISAP will strip off the '0044', and replace with '0'.

As each additional destination number is entered, it is validated against the Message Barring table. If the number entered is barred, due to a number itself being barred, or due to a national ChargeCard attempting to forward to an international number, or because an international source/destination pair is on a barred inter-country list, then the caller is played an apology stating that messages cannot be sent to that number. No delivery attempt will be made. The caller isthen asked if they would like to forward to another number. This barring table is configurable, and managed by the network operator, i.e. in this example by BT. For each message deposited, the ISAP will generate a billing record at the point where the caller confirm the message is to be sent, and a message and destination number have been successfully taken. If the caller does not confirm the message, then no message will be forwarded, and no billing record is created.

Message Status Check

ChargeCard holders using the S&FM service are be offered an option to check the delivery status of a message. The user may select a message delivery status retrieval dialogue. Through this dialogue the status of each message can be obtained, within 48 hours of its successful delivery or last delivery attempt. On accessing the message status dialogue, if there is more than one message on the system, the caller is told how many messages have been delivered (but not yet deleted), not yet delivered, or still being delivered.

The caller is then invited to hear the messages, and the status of each. Any messages not deleted will be played (newest first), and their status given (delivered, not delivered, or still being delivered). The caller may skip over the message replay at any point by pressing DTMF key '1'. This will take them to the status for that message. If there are no messages available, the caller will be informed. Once all messages and their corresponding status has been heard, the caller will be asked if they would like to leave a further message for forwarding. If the caller decides not to leave a message, a farewell message will be played stating that the caller should now press '##' to return to their ChargeCard menu. A billing record will be raised at the point a caller enters the message status dialogue Message Delivery Message delivery is handled automatically by the ISAP platform making a call out to the destination number. As shown in FIG. 5, if the call is answered (identified by a C7 Answer message being returned) the ISAP plays an introductory script providing an identification of the service followed by the message recorded by the sender. This message is played twice. Playing the message twice enables the message to be recorded successfully by an answer phone at the called party. If an Answer message is received the message is assumed to be successfully delivered. A billing record is generated and passed to the billing system.

The called party is then given the opportunity to have the message repeated again. Both speech recognition and DTMF override (1-yes, 2-no) are active. The prompt played to the user will only ask for '1' to be keyed in order for the user to hear the message again. Silence is taken as no. The user may have the message repeated twice.

A farewell message is played. The farewell message includes reference to the ChargeCard Store and Forward messaging, and provides a telephone number where more information about the service can be obtained.

The salutations and prompts given during message delivery are in the same language as that used when the message was deposited.

On failure to deliver a message, if the defined maximum number of delivery attempts has not been reached, the message is scheduled for another delivery attempt, after a defined inter-delivery gap. If the defined maximum number of delivery attempts has been reached, the message is marked as not delivered, and no further delivery attempts are made.

Messages are deleted 48 hours after successful delivery or the final delivery attempt.

Figure 2A:
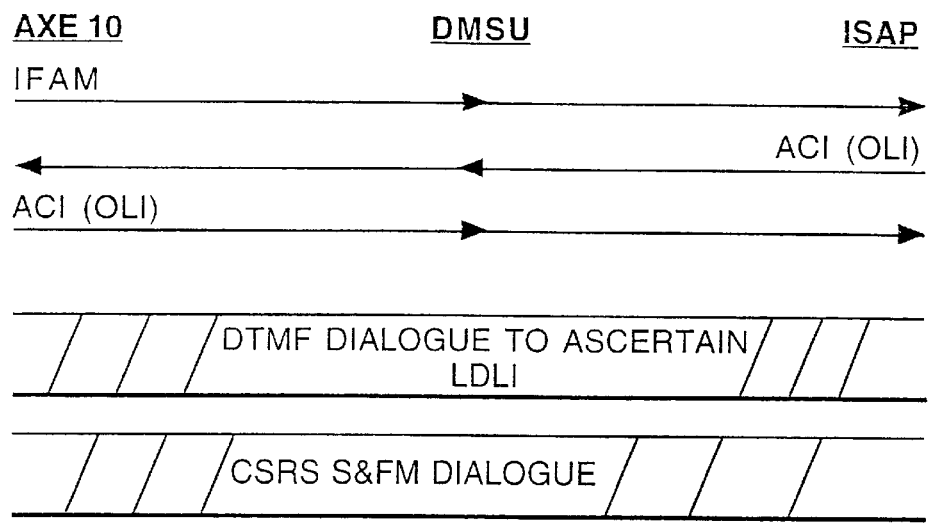
FIG. 2a-2c show signal flows in the network of FIG. 1
Figure 2B:
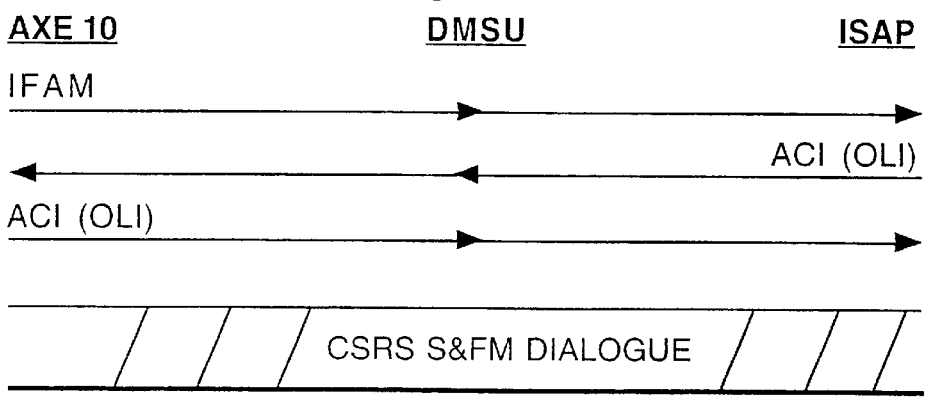
Figure 2C:
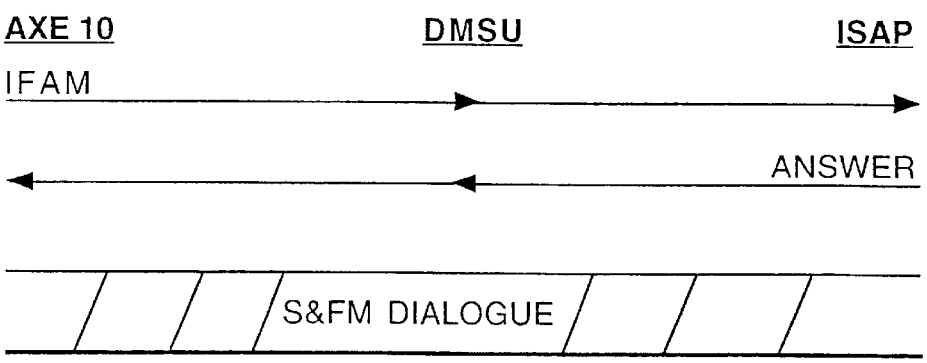

For message delivery attempts that experience Call Waiting, the message will not be played until the termination has answered. The Call Waiting announcement will not have any impact. For call divert, message delivery will be diverted to the new destination and in all cases of diversion the message platform will only start to play the message once the diverted-to destination has answered FIGS. 2a-2c shows signal flows in the network implementing the above service. In these Figures, the thin arrowed lines show signals on a common channel signalling network which links the AXE10 (that is the service platform signalling converter unit) the DMSU, the ISAP, and the message recipient. The broad lines (such as "DTMF dialogue" and "S&FM dialogue" show in-band signals carried on voice circuits between the different components. FIG. 2a shows the IFAM (Initial and Final Address Message) and ACI(OLI) (Additional Call Information) signals associated with an incoming call. A DTMF dialogue is used to convey the last dialled line identity (LDLI) (if any) from the service platform to the ISAP. The S&FM in-band dialogue implements the voice interaction between the user and the dialogue to accept or reject options for message store and forward, as described previously.

What is claimed is:

1. A method of providing a message forwarding service provisioned for a calling party via a network service platform in a telecommunications network, the calling party calling the message forwarding service by dialling a number associated with the message forwarding service, the method comprising:
   a) communicating a signal identifying the calling party, which calls the message forwarding service, to said network service platform connected to the telecommunications network, the network service platform being arranged to associate a subscriber profile with the calling party, the calling party subsequently dialling a called destination;
   b) initiating, in dependence on the subscriber profile associated with the calling party and said called destination number via the service platform, a call setup process for a call from the calling party to said called destination number;
   c) monitoring, at the service platform, network signalling indicating the status of the call setup process to the called destination number; and
   d) when the network signalling indicates call setup has not successfully completed, automatically offering to the calling party, via the network service platform and in dependence on the subscriber profile associated with the calling party, said message forwarding service provided for the calling party, the message forwarding service being arranged to enable the calling party to create a message to be forwarded to said called destination number prior to attempting to directly connect the calling party to the called destination number so that the calling party controls whether to create and forward a message to the called destination number.

2. A method according to claim 1, in which the said signal in step (a) is an account identity for the calling party.

3. A method according to claim 1, in which the call setup process to the called destination number continues while the message forwarding service is offered to the calling party.

4. A method according to claim 1, including offering the calling party direct access to the message forwarding service, and, for a call when direct access is selected by the calling party, not carrying out steps (b) to (d).

5. A method according to claim 1, in which the service platform includes an intelligent platform that stores the subscriber profile associated with the calling party, the subscriber profile having customer account data, and a telecommunications switch which is connected to a network signalling channel and which executes the call setup process via the network signalling channel, and the step of monitoring network signalling is carried out by the telecommunications switch.

6. A method according to claim 1, in which when the calling party selects the message forwarding service, the service platform connects the calling party to a messaging platform remote from the said service platform.

7. A method according to claim 6, in which the calling party account identity is transmitted to the messaging platform from the service platform in the dialled digit field of the network signalling channel.

8. A method according to claim 6, in which the called destination number is transmitted to the messaging platform as an in-band signal.

9. A method according to claim 1 in which when a calling party account identity is communicated to the service platform, the platform determines from calling party account data of the subscriber profile whether a message forwarding service is provisioned for the calling party, and communicates to a telecommunications switch a signal indicating whether the said service is provisioned.

10. A method according to claim 9, in which the said signal is communicated in the calling party category field of a signalling protocol defined for the interface between the platform and the telecommunications switch.

11. A method according to claim 1, wherein the method of providing a message forwarding service is implemented in a cashless calling service.

12. A method according to claim 1, wherein the calling party controls whether to create and forward a message to the called destination number irrespective of whether the called destination number is available for connection or not.

13. A service platform providing a message forwarding service provisioned for a calling party comprising:
   a) a signalling interface for receiving a signal identifying a calling party, the calling party calling the service platform by dialling a number associated with the service platform;
   b) a data store programmed with customer data including a subscriber profile of the calling party;
   c) means for monitoring the progress of a call setup process for a call from the calling party to a called destination number, the calling party calling the called destination number by dialling the called destination number subsequent to calling the service platform; and d) message service control means responsive to said means for monitoring and customer data of the subscriber profile associated with the calling party, and arranged to offer the calling party a message forwarding service provided for the calling party when call setup has not completed successfully, the message forwarding service being arranged to enable the calling party to create a message to be forwarded to said called destination number prior to attempting to directly connect the calling party to the called destination number so that the calling party controls whether to create and forward a message to the called destination number.

14. A service platform according to claim 13, in which the data store is programmed with customer account data.

15. A service platform according to claim 13, wherein the service platform is a cashless calling platform.

16. A service platform according to claim 13, wherein the calling party controls whether to create and forward a message to the called destination number irrespective of whether the called destination number is available for connection or not.

* * * * *